United States Patent Office 3,544,209
Patented Dec. 1, 1970

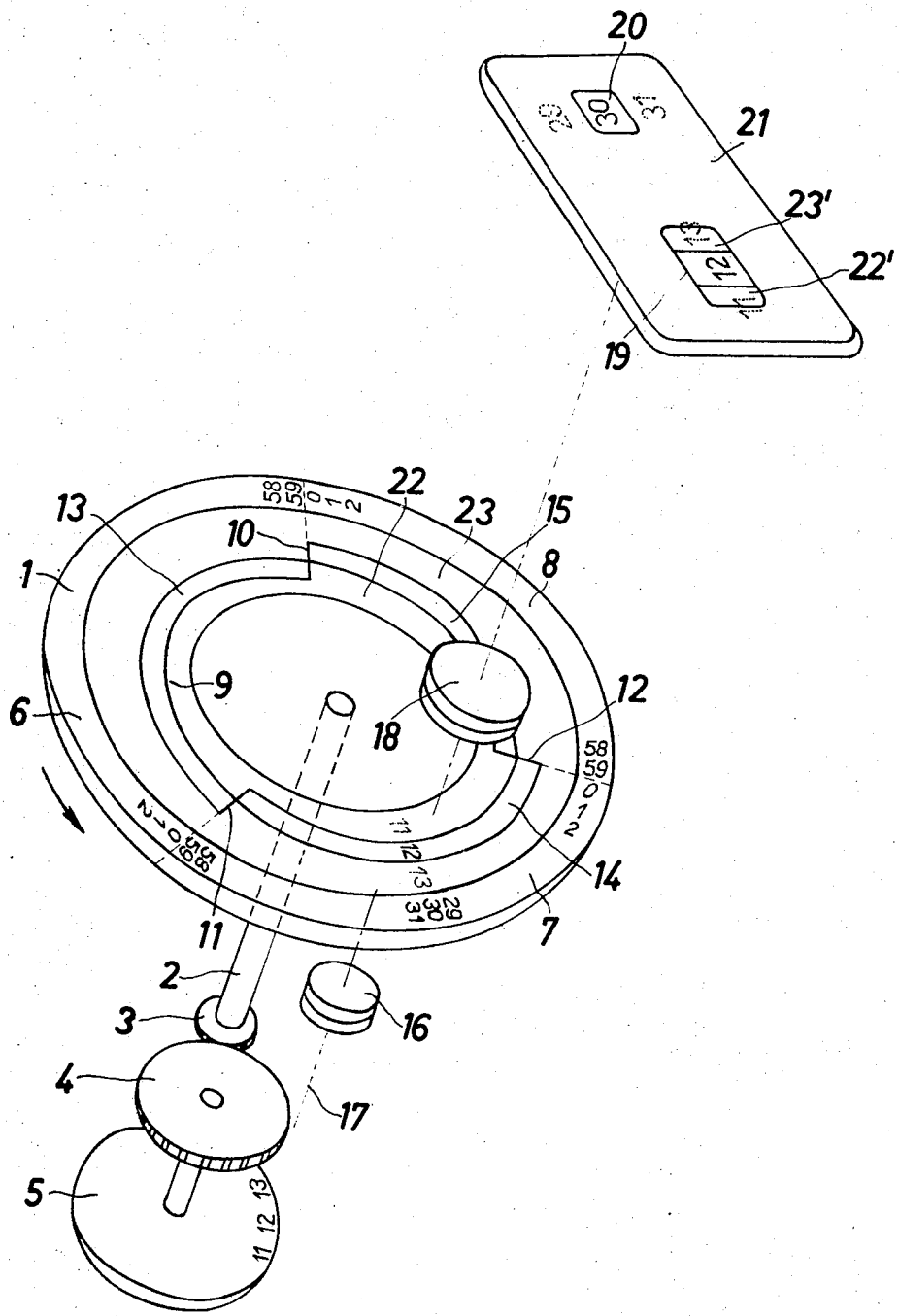

3,544,209
OPTICAL COUNTERS
Kurt Schanda, Jena, Germany, assignor to VEB Carl Zeiss Jena, Gera, Germany
Filed Feb. 26, 1968, Ser. No. 708,435
Int. Cl. G03b 21/00
U.S. Cl. 353—41                                    2 Claims

ABSTRACT OF THE DISCLOSURE

An optical counter, particularly for use with testing devices, includes two transparent figure dials which are interconnected by a reduction gear, one of these dials containing a diaphragm having helical apertures. A first optical system images the numerals of the one dial in the plane of the other dial, and a second optical system projects the numerals of both dials on a projection screen.

---

This invention relates to an optical counter which images test values on a projection screen, particularly for use in testing devices including circular scales and the like.

In a known optical counter, a stationary optical system magnifies one interval of a rotatable coarse scale and projects the magnified image on a screen provided with a precision scale. An index fork below the screen is displaceable parallel to the coarse scale, and an optical system fast with the fork produces on the projection screen a magnified image of the precision scale. The precision scale is of the length of one imaged interval of the coarse scale and divided to represent decimal values. If the index fork is adjusted to enframe a dividing line of the coarse scale, the optical system fast with the fork images on the projection screen the respective decimal value of the precision scale, the image of which appears next to that of the value of the coarse scale correlated to the division line.

This known counter suffers from the disadvantage that the precision scale in the interest of sufficient reading accuracy requires a great number of numerals, so that the element carrying these numerals must need be of so great dimensions as to take up considerable space.

Known mechanical counters with digital display comprise rollers which are marked with a plurality of numerals, these rollers being in juxtaposition to each other and interconneced by switching mechanisms. Counters of that kind have the disadvantage that a roller can carry only comparatively few numerals, since, otherwise, it would have too great a diameter and accordingly too great a dynamic moment of inertia. Further disadvantages are considerable stress and wear and the requirement of much energy for switching. Such counters with rollers are moreover rather noisy, particularly if the counting velocity is high, and they are not very suitable for optical imaging, the tested values being often projected at an unfavorable place.

The present invention aims at considerably reducing the foregoing disadvantages of known counters, particularly at minimizing the complexity due to the necessary great quantity of numerals, and at eliminating to the greatest possible extent the expenditure of energy in the switching operations.

To this end the invention consists in an optical counter with display of numerals and having a carrier bearing comparatively few numerals, but which offers good possibilities of subdivision and enables the adjusted or measured values to be easily and accurately read at a conspicuous place, characterized in that the counter comprises at least two transparent figure dials interconnected by a reduction gear, these dials being respectively a drive dial wtih numerals of lower order (seconds) and a secondary dial with numerals of higher order (minutes), and that a stationary optical system images the numerals of the secondary dial in the plane of the drive dial, the drive dial being provided with a diaphragm having at least one helical aperture for the transmission at any one time of only the image of one of the numerals of the secondary dial.

Advantageously, the drive dial is divided into sectors each of which bears fractions or decimals of a unit of the secondary dial, and the helical apertures of the diaphragm are stepped relatively to each other at places corresponding to the boundary lines of the sectors of the drive dial.

It is furthermore advantageous to provide that, in a rotation of the drive dial synchronous to the motion of the numerals which is due to the rotation of the operatively connected secondary dial, the shifting of the diaphragm aperture in the plane of the drive dial relative to the center of rotation is such that, during a full passage of a sector bearing fractional or decimal values only one numeral of the secondary dial is visible in the diaphragm aperture traversed by the imaging ray path, and that the next numeral of the secondary dial will jump into appearance only after the passage of one of the steps at the recesses of the diaphragm through the imaging ray path. Finally, it is advantageous to provide that the image of the numerals of the secondary dial and the coordinated numerals of the fraction or decimal of the sectors of the drive dial are jointly so imaged by optical means in per se known manner as to appear in their natural sequence next to each other in the windows of a projection screen.

In a counter of the foregoing kind only one numeral of the secondary dial is visible in a diaphragm aperture of the drive dial. Errors which in known counters are possible due to the appearance of two numerals at a time, for example in a medial position, are thus excluded. The mechanical and optical step-down in the counter of the invention offers in a simple manner the advantage of a considerable reduction of the quantity of numerals which in known apparatus of this kind are required for identifying the fractions or decimals and render the apparatus bulky and uneconomical.

In order that the invention may be more readily understood, reference is made to the accompanying drawing which illustrates diagrammatically and by way of example one embodiment thereof.

In the drawing, a drive dial 1 is rotatable by means of a driving mechanism (not shown) about a shaft 2 and is connected by means of a reduction gear 3 and 4 at a ratio 20:1 with a secondary dial 5. The numerals on the dial 5 represent minutes from 0 to 59. The dial 1 is divided into three sectors 6, 7, and 8 which, in the drawing, are separated from each other by dotted lines. Each of these sectors bears numerals representing seconds from 0 to 59. The dial 1 is provided with a frosted annular diaphragm 9 having three helical apertures 13, 14, and 15 recessed relatively to one another by steps 10, 11, and 12. The three apertures 13, 14 and 15 extend respectively over the sectors 6, 7 and 8. The axis of the dial 5 is parallel to that of the shaft 2. A light source (not shown) and a stationary optical system 16 in the plane of the dial 1 image the numerals of the dial 5 in the plane of that of the apertures 13, 14, and 15 which happens to be conjugated to the imaging ray path 17. The breadth of the apertures 13, 14, and 15 corresponds to that of the image of an interval between two numerals on the dial 5. When The dial 1 is provided with a frosted annular diaphragm diaphragm apertures 13, 14, and 15 in the plane of the dial 1 relative to the center of rotation of the dial 1 takes place synchronously to the motion of the minute values, which is due to the operative connection of the dials 1 and 5. Accordingly, in the embodiment shown in the drawing, there is visible in the diaphragm aperture 14 only the image of the numeral "12" of the dial 5, this image remaining visible as long as the sector 7 bearing second values passes through the ray path 17. Only after the passage of the step 11 of the diaphragm 9 through the imaging-ray 17 will the dial 1 in its further rotation along the direction of the arrow cause the next numeral "13" of the dial 5 to jump into appearance in the aperture 13 now traversed by the ray path 17.

The numeral "12" of the dial 5, which the optical system 16 images in the diaphragm aperture 14 and which corresponds to the minute value, and the numeral "30" of the dial 1, which corresponds to the respective second value, are projected by a lens 18 in known manner in the windows 19 and 20, respectively, of the projection screen 21.

In order to provide that the test values to be adjusted or read in the windows 19, and 20 of the projection screen 21 appear in correct sequence (minutes, seconds), the direction of the sequence of the numerals on the margin of the dial 1 and that of the numerals on the dial 5 are at right angles to each other. As the breadth of the helical diaphragm apertures 13, 14, and 15 corresponds to one interval of the numerals of the minute values imaged in the plane of the dial 1, only the numeral "12" is visible in the window 19, the numerals "11" and "13" on either side of it (indicated in the drawing by dotted lines) being respectively masked by the frosted portions 22 and 23 of the diaphragm 9. According to the shifting of the diaphragm apertures 13, 14, and 15 in the plane of the dial 1 the images 22', 23' of the frosted portions 22, and 23 of the diaphragm 9, together with the image of the captured minute value of the dial 5, travel along the window 19 of the screen 21. Only after the full passage of one of the sectors of the dial 1, whose numerals corresponding to the second values 0 to 59 thereby travel along the window 20, will the next numeral of the minute values of the dial 5 jump into appearance in the window 19.

The dial 1, made up of three sectors with second values from 0 to 59 each, comprises 3·60=180 numerals. With a step-down gear 3, 4 of a reduction 20:1, a complete rotation of the dial 5, bearing 60 minute numerals, corresponds to 20·180=3600 second values on the dial 1. This considerable subdivision in the counter of the invention is obtained to great advantage with, compartively, as few numerals as 180 on the dial 1 and 60 on the dial 5. This means however that only 240 numbers are required in all.

The quantity of the numerals for test values can be easily increased, if necessary, by multiplying the constructional elements referred to hereinbefore.

The embodiment of the invention particularly described is presented merely as an example of how the invention may be applied. It is of course possible to use the invention not only for counting circular and angular divisions but, by providing on the number carriers such values as millimeters, microns, etc., for the adjustment or measurement of lengths.

I claim:

1. An optical counter imaging test values on a projection screen, comprising a transparent drive dial with numerals of lower order and a transparent secondary dial with numerals of higher order, a reduction gear interconnecting said two dials, a stationary first optical system imaging the numerals of said secondary dial in the plane of said drive dial, a projection screen, and a second optical system imaging the numerals of both said dials in their natural sequence next to each other in the plane of said projection screen, said drive dial being provided with a diaphragm having a helical aperture for the transmission at any one time of only the image of one of the numerals of said secondary dial.

2. An optical counter as claimed in claim 1, wherein said drive dial is divided into sectors, each of said sectors bearing fractions of a unit of said secondary dial, the helical apertures of said diaphragm being stepped relatively to each other at places corresponding to the boundary lines of said sectors.

References Cited

UNITED STATES PATENTS 2,834,250    5/1958    Stefani _____ 353—40

FOREIGN PATENTS 1,131,122    1960    Germany _____ 353—40

WILLIAM D. MARTIN, JR., Primary Examiner

U.S. Cl. X.R.

33—1